April 25, 1961 R. J. BERNOTAS 2,981,356
POWER STEERING FOLLOW-UP CONTROL
Filed May 13, 1959 3 Sheets-Sheet 1

INVENTOR.
Ralph J. Bernotas
BY
J. E. McGlynn Jr.
ATTORNEY

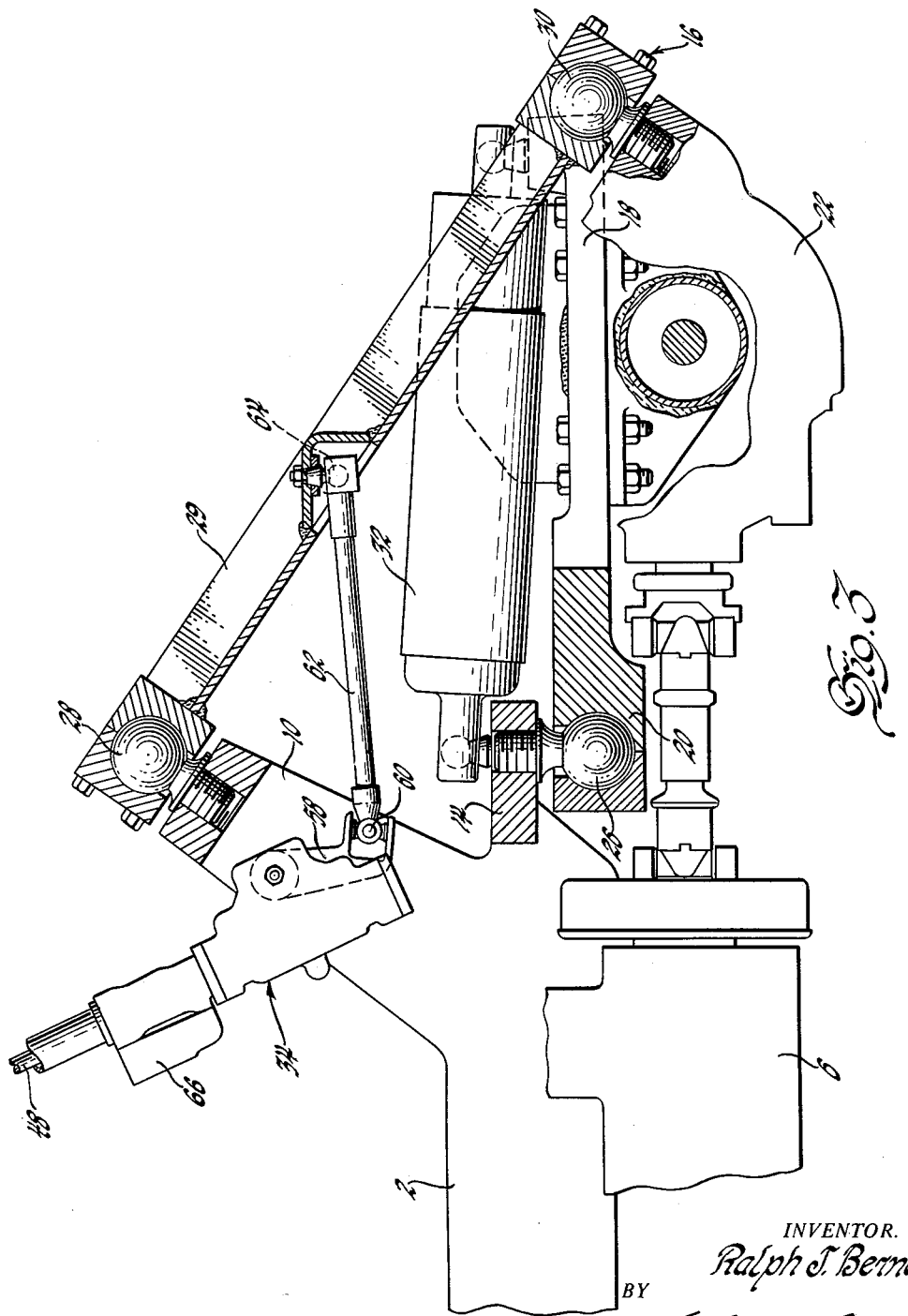

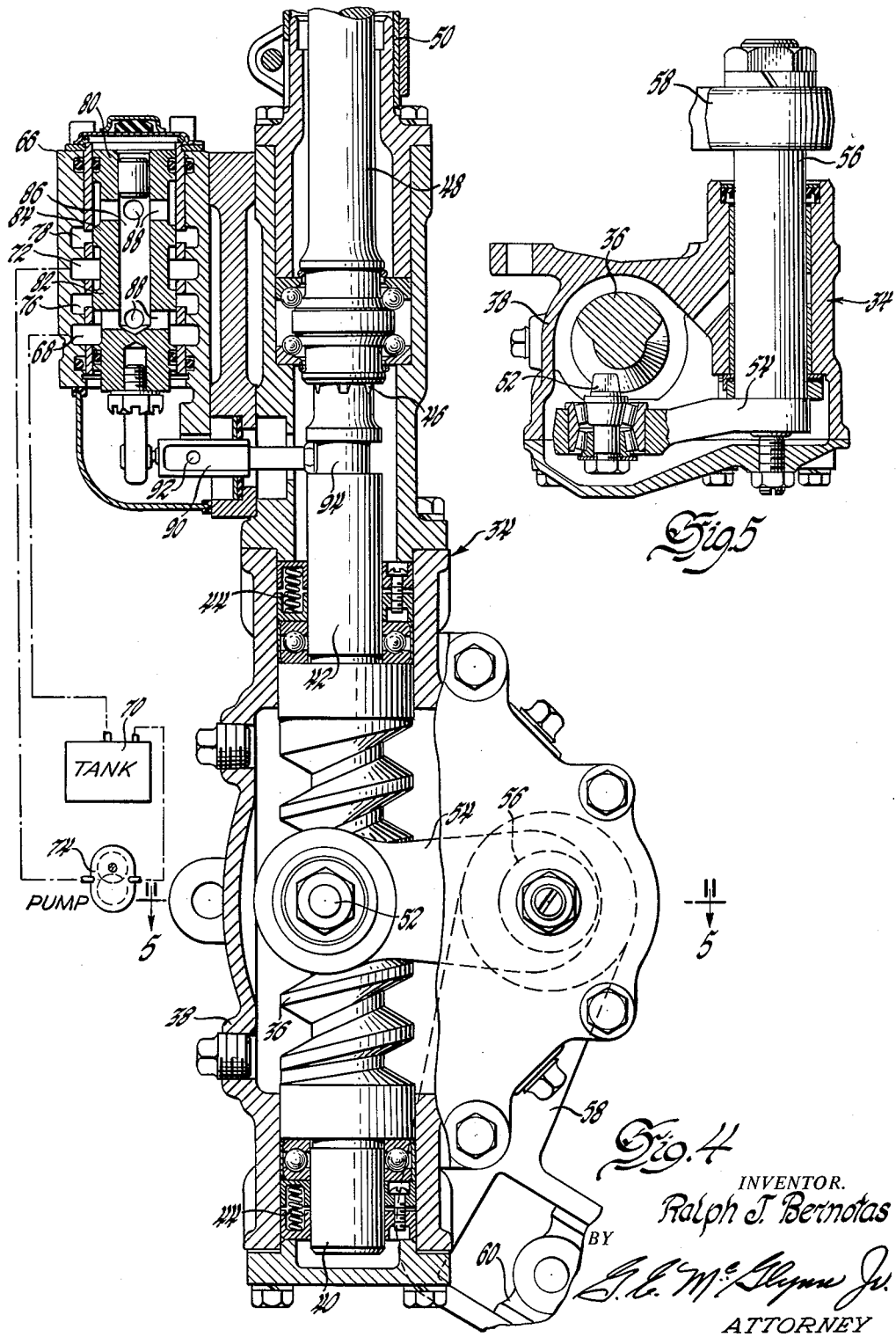

United States Patent Office 2,981,356
Patented Apr. 25, 1961

2,981,356
POWER STEERING FOLLOW-UP CONTROL

Ralph J. Bernotas, South Euclid, Ohio, assignor to General Motors Corporation, Detroit, Mich., a corporation of Delaware Filed May 13, 1959, Ser. No. 812,930

7 Claims. (Cl. 180—79.2)

This invention pertains to a power steering system including a follow-up control and, more particularly, to such a system in combination with a vehicle comprising main and auxiliary frames operatively connected for relative steering articulation about a substantially vertical axis and relative frame oscillation about a horizontal extending axis.

The present invention is particularly directed to the problem of power steering for that particular class of vehicles designed for what may be termed pivot type steering movement. Such vehicles are to be found primarily in the material handling or earth-working arts and typically comprise main and auxiliary frames operatively connected on a vertical axis of relative steering articulation and a horizontal axis of relative frame oscillation. In such vehicles, each frame section is supplied with a wheel-driving axle and wheel mounting means supporting the wheels non-dirigibly or non-steerably with respect to the respective frame sections. Due to the heavy work over irregular terrain to which such vehicles are normally subjected, these vehicles are preferably equipped with four-wheel drive with the aforementioned horizontal axis of relative frame oscillation serving the purpose of maintaining the driving axles in power transmitting contact with the ground as the vehicle traverses irregular terrain. However, inasmuch as relative oscillation as well as relative steering movement occurs between the two frame sections, a problem is presented with respect to the fluid power steering systems employed with such vehicles to insure a proper follow-up control for the steering system. In particular, some means must be provided which will provide the follow-up function for the power steering system in response to relative steering movement between the frame sections while avoiding inadvertent follow-up control in response to relative frame oscillation.

It is, therefore, a principal object and feature of this invention to provide a power steering system including a follow-up control for a vehicle of the pivot steer type which includes means connecting the two frame sections for relative frame oscillation about a horizontal axis.

It is yet another object of this invention to provide a follow-up control mechanism for a fluid power steering system for a vehicle comprising two frame sections articulably connected about a vertical steering axis and connected on a horizontal axis of relative frame oscillation in which the follow-up steering control mechanism responds to steering movement of the vehicle while not responding to relative oscillation of the auxiliary and main frames.

In general, these and other objects of this invention are attained in a vehicle comprising a main frame and an auxiliary frame, each frame being provided with non-dirigibly or non-steerably mounted wheels. The immediately adjacent ends of these frames are connected by a ball joint connection, while a rigid suspension or compression link has one end connected by a second ball joint to the main frame and its other end connected to the auxiliary frame by a third ball joint. The ball joint connection of the one end of the rigid link is vertically spaced from the ball joint connection between the frames so as to define a substantially vertical axis of relative frame oscillation, while the ball joint connection of the other end of the rigid link is spaced forwardly from the ball joint connection between the frames to define a horizontally longitudinally extending axis of frame oscillation with the vehicle in the straight-ahead steered position. A power steering system includes one or more fluid-operated jacks operatively connected between the frames to articulate the latter about the aforementioned vertical steering axis. The flow of steering fluid under pressure to the steering jack or jacks is supplied by a fluid power steering system including a follow-up control valve. The steering gear is operatively connected to the auxiliary frame by a follow-up control rod so as to provide steering follow-up only in accordance with relative steering articulation of the frames, and not in response to relative frame oscillation.

These and other objects of this invention will become more apparent hereinafter as the description of the invention proceeds, and in which reference is made to the drawings in which:

Figure 3 is an enlarged view taken on line 3—3 of Figure 2;

Figure 4 is an enlarged fragmentary sectional view of the fluid power steering gear shown in Figures 1, 2 and 3; and Figure 5 is a view taken on line 5—5 of Figure 4.

Figure 1:
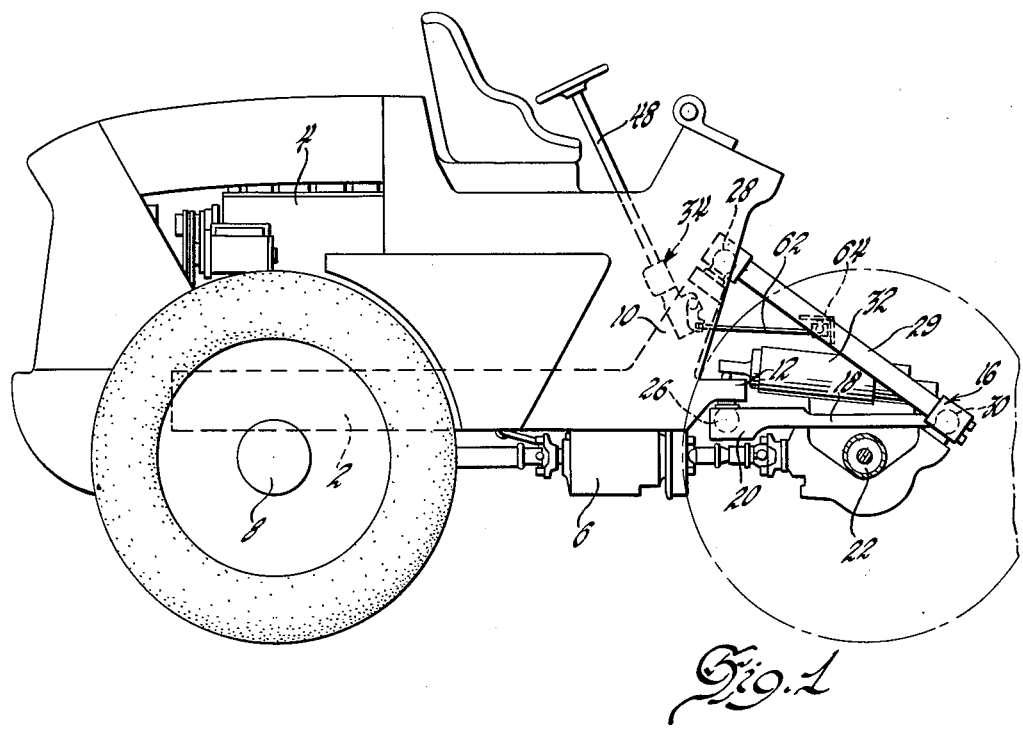
Figure 1 is a side elevation of a vehicle equipped with the present invention.

Referring now to the drawings, there is shown a rubber-tired tractor having a main frame 2 on which there is mounted behind the vehicle operator's compartment a power plant 4 for transmitting drive through the transmission 6 to the rear axle 8. At its forward end, the main frame has an upwardly and forwardly inclined yoke or neck 10 which, at its top, extends between two laterally spaced forwardly presented horizontal projections 12 on the main frame between which there is a third projection 14 substantially equidistant from the projections 12.

The steerable auxiliary frame 16 is of wishbone configuration including two laterally spaced forwardly extending legs 18 and a rearwardly projecting tongue 20. A front axle construction 22 is rigidly bolted at 24 beneath the auxiliary frame 16 so as to extend laterally between the legs thereof. A drive line transmits drive from the transmission 6 to the front axle 22 so as to provide a vehicle having four-wheel drive.

Referring to Figure 3 in particular, it may be seen that the auxiliary frame tongue 20 has a suitably formed socket therein to receive the downwardly presented ball 26 secured in the forward projection 14 of the main frame 2. A similar ball 28 is secured to the upper horizontally extending wall of the yoke or neck 10 of the main frame vertically above the ball 26, and is engaged within a socket formed in the upper end of the downwardly and forwardly inclined compression or suspension link or torque brace 29 having a suitable socket at its lower or other end for receipt of a ball 30 secured to the axle construction 22 on the auxiliary frame substantially equidistant from the leg 18 thereof.

It will be noted that in the forward steering position as shown in the drawings, the three ball and socket connections are substantially in a vertical longitudinally extending plane passing through the mid-point of the vehicle. Moreover, the ball joint connections 26 and 28 define a vertical steering axis about which the respective vehicle frames may be selectively articulated, while the ball joint connections 26 and 30 define a horizontal axis about which the frames may oscillate. Where all four wheels of the vehicle drive as shown in the preferred embodiment of this invention, such a horizontal axis of oscillation is desired to prevent the vehicle from being supported only by one rear wheel and the diametrically opposite front wheel while traversing irregular terrain. Such a condition would cause a loss of drive due to the differential action in the respective axle final drives. The construction aforementioned precludes this condition from occurring, it being understood, of course, that suitable stop means are incorporated in the construction to limit to any desired degree the amount of relative frame oscillation.

Two laterally spaced fluid-operated steering jacks 32 each have one end universally connected to the forward ends of a wishbone leg 18 and the other end connected to a forwardly extending projection 12 on the main frame. It will be understood that each of the steering jacks are preferably of the push-pull or double-acting type so that, upon supplying pressure fluid thereto, one jack may extend while the other contracts to accomplish relative steering movement about the aforementioned steering axis. Moreover, supply of pressure fluid to these steering jacks is controlled by a power steering gear now to be described.

The fluid power steering gear may be any one of the several known forms which provide follow-up control during steering. Therefore, for the purpose of this disclosure, reference will be made to the significant structure of one type of gear which may be employed, and which is well known and commercially available. Referring now in particular to Figures 3 and 4, the steering gear 34 may be seen to be rigidly mounted to the main frame 2 substantially within the yoke or neck 10. A worm gear 36 is rotatably supported within the steering gear housing 38 by the respective stub shafts 40 and 42. The usual self-centering spring construction 44 is located at each end of the worm gear, while the stub shaft 42 projects from the latter for a splined connection at 46 to a manually rotatable steering shaft 48 enclosed within the usual mast 50. It will be understood that the steering shaft 48 is secured to the worm gear 36 to drive the latter rotatably, while the aforementioned splined connection permits relative axial movement between these components.

A worm gear follower 52 or driven gear means is meshingly engaged with the worm gear 36, and is rotatably supported at one end of the crank arm 54. The crank arm 54 is non-rotatably secured to a rock shaft 56 which projects out of the steering gear housing and is non-rotatably secured to a pitman arm 58. A double clevis type universal joint 60 connects one end of the follow-up rod 62 to the free end of the pitman arm 58, while the other end of the follow-up rod projects laterally toward and is secured by a universal ball joint 64 to the rigid torque brace or link 29 on the longitudinal axis of the latter in a vertical plane containing the aforementioned vertical steering axis and horizontal axis of relative frame oscillation.

A valve body or housing 66 is suitably rigidly secured to the steering gear housing and includes an annular exhaust port 68 communicating with a tank or fluid reservoir 70, and an annular inlet port 72 communicating with a source of fluid pressure such as the pump 74. To either side of the inlet port 72 there are provided the pressure outlet ports 76 and 78. It will be appreciated that, according to conventional practice, the pressure port 76 is connected to one end of one of the steering jacks 32 and to the other end of the other steering jack for movement of these jacks in opposite directions during steering movement. In a similar fashion, the pressure port 78 is connected to the opposite ends of these jacks. With the valve actuated to supply pressure fluid from the inlet port 72 to one or the other of the pressure ports 76 or 78, the steering jacks are actuated in the appropriate direction while exhaust fluid from the opposite ends of the jacks are dumped to tank through the other pressure port.

The valve spool 80 is reciprocably disposed within the valve body 66 and includes axially spaced valve lands 82 and 84 controlling the flow of fluid through the valve ports. Additionally, the valve spool is provided with a central passage 86 communicating with axially spaced groups of radially projecting passages 88 to provide for the exhaust of fluid from port 78 to exhaust port 68 with the spool in one of its positions. The valve is adapted to be moved in response to relative axial movement between the worm shaft 42 and steering shaft 48 by means of a lever 90 pivoted to the valve body at 92 and having one end engaged in an annular groove 94 in the worm shaft, while the other end is suitably secured to one end of the valve spool 80.

Figure 2:
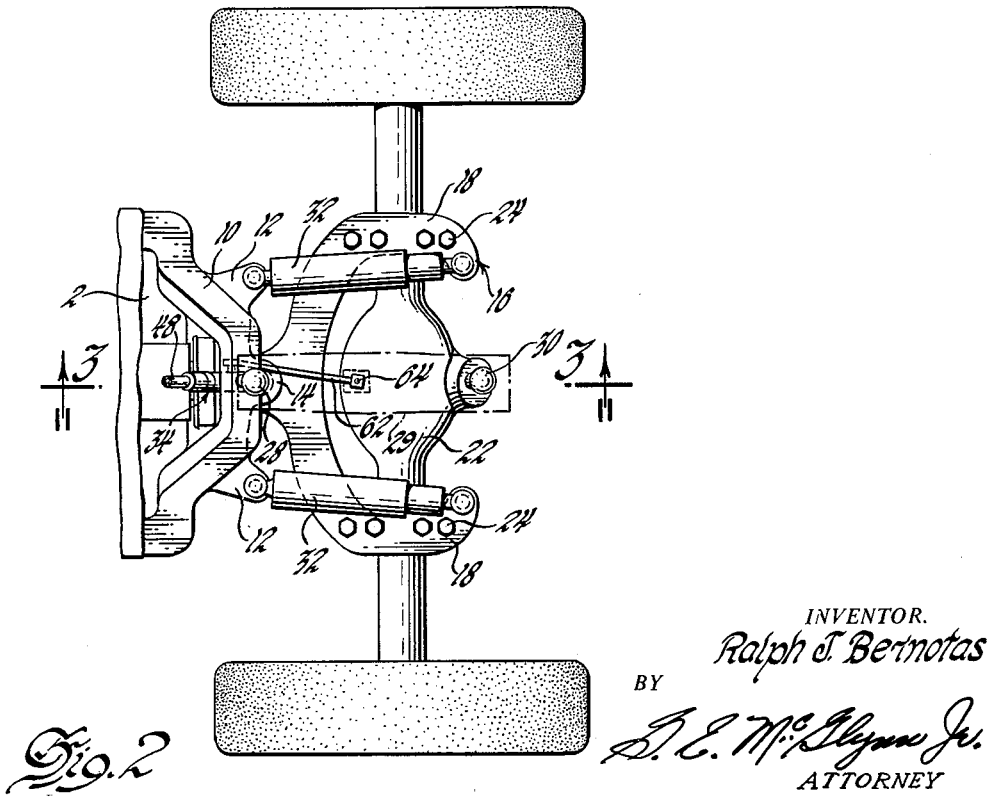
Figure 2 is a fragmentary plan view of Figure 1 illustrating certain details of the invention.

With respect to a description of the operation of this apparatus, it may be assumed that the vehicle is disposed in a straight-ahead steered direction as shown in Figures 1 and 2. At this time, the steering gear is disposed as shown in Figure 4. If a turn is to be made, the vehicle operator will rotate the steering shaft 48 causing resultant rotation of the worm gear 36. However, the driven or follower member 52 reacts against the worm gear due to its connection to the rigid link 29 by means of the follow-up rod 62. Accordingly, this reaction or resistance to steering movement results in axial shifting movement of the worm gear shaft 42 thereby causing the valve spool 80 to be reciprocated in the proper direction depending upon the direction of steer. If the valve spool is shifted to the left in Figure 4, pressure is supplied from inlet port 72 to the pressure port 76 to operate the steering jacks, while exhaust fluid therefrom passes from the port 78 through the passage 86 and passages 88 to the exhaust port 68. If the valve is shifted in the opposite direction, pressure fluid is supplied from the inlet port 72 to the pressure port 78, while exhaust fluid from the steering jacks passes directly from the port 76 to the exhaust port 68.

As the steering jacks receive fluid under pressure, the auxiliary frame 16 is articulated in the proper direction about the vertical steering axis defined by the centers of ball members 26 and 28. The follow-up rod 62, in response to such steering movement, operates through the pitman arm 58, shaft 56 and crank arm 54 to relieve the reactive force on the worm gear 36 thereby resulting in the self-centering springs 44 gradually returning the worm gear shaft to its reference position relative to the steering shaft. Consequently, progressively as the desired steering action is achieved, the spool valve 80 is returned to its normal position blocking flow of fluid through the valve. If additional steering action is desired, the steering shaft 48 is rotated to an additional extent, and the aforedescribed operation is repeated accordingly until such time as steering action is discontinued.

As a result of the above construction, the follow-up control rod 62 will sense relative steering articulation of the vehicle frames and accordingly adjust or provide follow-up control for the power steering control valve in the manner aforedescribed. However, inasmuch as the ball joint connection 64 of the rod is contained in a vertical plane through the longitudinal axis of the rigid link 29 and the aforementioned horizontal axis of frame oscillation, the follow-up rod is not subjected to an undesirable amount of movement as the auxiliary frame 16 oscillates relative to the main frame about the centers of ball members 26 and 30. Accordingly, relative frame oscillation during steering movement or, for that matter, while the vehicle is being steered straight-ahead does not adversely affect the positioning of the spool valve 80, and, hence, operation of the power steering system. Although shims are preferably employed in mounting each end of the rigid link 29 with respect to the ball members 28 and 30, there is necessarily some degree of oscillation of the rigid link about the axis of these ball members. However, this action is not inordinate and does not adversely affect the operation of the power steering system because of the location of the universal joint connection 64 on the longitudinal axis of the rigid link.

While but one form of the invention has been selected for a description thereof, other forms will be apparent to those skilled in the art. Therefore, the embodiment shown in the drawing is merely for illustrative purposes, and is not intended to limit the scope of the invention which is defined by the claims which follow.

I claim:

1. A steerable vehicle comprising a main frame, an auxiliary frame, wheel means non-dirigibly mounted on each of said frames, means interconnecting said frames for relative steering articulation about a substantially vertical axis and relative oscillation about a horizontal longitudinally extending axis with said frames steered in a straight-ahead direction, a fluid-operated steering jack interconnecting said frames and being operable to articulate said frames about said vertical axis, a fluid power steering system including valve means on one of said frames controlling the flow of fluid pressure to said steering jack, and a follow-up rod operatively connecting said valve means to the other of said frames in a vertical plane through said horizontal axis of relative frame oscillation.

2. A steerable vehicle comprising a main frame, an auxiliary frame, wheel means non-dirigibly mounted on each of said frames, means interconnecting said frames for relative steering articulation about a substantially vertical axis and relative oscillation about a horizontal longitudinally extending axis with said frames steered in a straight-ahead direction, a fluid-operated steering jack interconnecting said frames and being operable to articulate said frames about said vertical axis, a fluid power steering gear on said main frame including engaged driving and driven gear means, a manually rotatable steering shaft, means rotatably drivingly connecting said steering shaft to said driving means for limited axial movement of said driving means relative to said steering shaft, valve means controlling the flow of fluid pressure to said steering jack, linkage means connecting said driving means to said valve means to position the latter in response to relative axial movement between said driving means and steering shaft, and a follow-up rod operatively connecting said driven means to said auxiliary frame in a vertical plane through said horizontal axis of relative frame oscillation.

3. A steerable vehicle comprising a main frame, an auxiliary frame, wheel means non-dirigibly mounted on each of said frames, a first universal joint connecting the adjacent ends of said frames, a rigid suspension link, a second universal joint connecting one end of said link to said main frame at a point spaced vertically above said first universal joint and defining with the latter a vertical axis of relative frame steering articulation, a third universal joint connecting the other end of said link to said auxiliary frame at a point spaced horizontally forwardly of said first universal joint and defining with the latter a horizontal longitudinally extending axis of relative frame oscillation with said frames steered in a straight-ahead direction, a fluid-operated steering jack interconnecting said frames and being operable to articulate said frames about said vertical axis, a fluid power steering system including valve means on said main frame controlling the flow of fluid pressure to said steering jack, and a follow-up rod operatively connecting said valve means to said auxiliary frame in a vertical plane through said horizontal axis of relative frame oscillation.

4. A steerable vehicle comprising a main frame, an auxiliary frame, wheel means non-dirigibly mounted on each of said frames, a first universal joint connecting the adjacent ends of said frames, a rigid suspension link, a second universal joint connecting one end of said link to said main frame at a point spaced vertically above said first universal joint and defining with the latter a vertical axis of relative frame steering articulation, a third universal joint connecting the other end of said link to said auxiliary frame at a point spaced horizontally forwardly of said first universal joint and defining with the latter a horizontal longitudinally extending axis of relative frame oscillation with said frames steered in a straight-ahead direction, a fluid-operated steering jack interconnecting said frames and being operable to articulate said frames about said vertical axis, a fluid power steering system including valve means controlling the flow of fluid pressure to said steering jack, and a follow-up rod operatively connecting said valve means to said rigid link intermediate the ends of the latter and in a vertical plane through said horizontal axis of relative frame oscillation.

5. A steerable vehicle comprising a main frame, an auxiliary frame, wheel means non-dirigibly mounted on each of said frames, a first universal joint connecting the adjacent ends of said frames, a rigid suspension link, a second universal joint connecting one end of said link to said main frame at a point spaced vertically above said first universal joint and defining with the latter a vertical axis of relative frame steering articulation, a third universal joint connecting the other end of said link to said auxiliary frame at a point spaced horizontally forwardly of said first universal joint and defining with the latter a horizontal longitudinally extending axis of relative frame oscillation with said frames steered in a straight-ahead direction, a fluid-operated steering jack interconnecting said frames and being operable to articulate said frames about said vertical axis, a fluid power steering gear on said main frame including engaged driving and driven gear means, a manually rotatable steering shaft, means rotatably drivingly connecting said steering shaft to said driving means for relative axial movement therebetween, valve means controlling the flow of fluid pressure to said steering jack, linkage means connecting said driving means to said valve means to position the latter in response to relative axial movement between said driving means and steering shaft, and a follow-up rod operatively connecting said driven means to said auxiliary frame in a vertical plane through said horizontal axis of relative frame oscillation.

6. A steerable vehicle comprising a main frame, an auxiliary frame, wheel means non-dirigibly mounted on each of said frames, a first ball joint connection between adjacent ends of said frames, a rigid link having one end connected to said main frame by a second ball joint connection at a point spaced vertically above said first ball joint connection, said rigid link extending forwardly and downwardly from said second connection and having its other end connected to said auxiliary frame by a third ball joint connection at a point spaced horizontally forwardly of said first ball joint connection, said first and second ball joint connections defining a vertically extending axis of relative frame articulation through the centers of the ball elements of said first and second ball joint connections, said first and third ball joint connections defining a horizontally longitudinally extending axis of relative frame oscillation through the centers of the ball elements of said first and third ball joint connections with said frames steered in a straight ahead direction, a fluid power steering system including valve means controlling the flow of fluid pressure to said steering jack, and a follow-up rod having one end operatively connected to said valve means and the other end pivotally connected to said rigid link substantially on the longitudinal axis of the latter.

7. A steerable vehicle comprising a main frame, an auxiliary frame, wheel means non-dirigibly mounted on each of said frames, a first ball joint connection between adjacent ends of said frames, a rigid link having one end connected to said main frame by a second ball joint connection at a point spaced vertically above said first ball joint connection, said rigid link extending forwardly and downwardly from said second connection and having its other end connected to said auxiliary frame by a third ball joint connection at a point spaced horizontally forwardly of said first ball joint connection, said first and second ball joint connections defining a vertically extending axis of relative frame articulation through the centers of the ball elements of said first and second ball joint connections, said first and third ball joint connections defining a horizontally longitudinally extending axis of relative frame oscillation through the centers of the ball elements of said first and third ball joint connections with said frames steered in a straight-ahead direction, a fluid power steering gear on said main frame including engaged driving and driven gear means, a manually rotatable steering shaft, means rotatably drivingly connecting said steering shaft to said driving means for relative axial movement therebetween, valve means for controlling the flow of fluid pressure to said steering jack, linkage means connecting said driving means to said valve means to position the latter in response to relative axial movement between said driving means and steering shaft, and a follow-up rod having one end operatively connected to said driven means and the other end pivotally connected to said rigid link intermediate the ends of the latter and in a vertical plane through said horizontal axis of relative frame oscillation.

References Cited in the file of this patent
UNITED STATES PATENTS 2,896,734     Toth                   July 28, 1959